Patented May 3, 1927.

1,627,452

UNITED STATES PATENT OFFICE.

WALTHER CORNELIUS HARRY PATAKY, OF THE HAGUE, AND FREDERIK JAN NELLENSTEIJN, OF DELFT, NETHERLANDS.

PROCESS FOR MAKING FATTY ACIDS FROM HYDROCARBONS.

No Drawing. Application filed August 24, 1925, Serial No. 52,226, and in Germany August 27, 1924.

It is known that certain hydrocarbons, as for example petroleum, paraffin etc. can be oxidized by oxygen or air in the presence or absence of catalysts with production of fatty acids. A mixture of fatty acids of low and high molecular weights, hydroxy-acids, aldehydes, ketones and other compounds was generally produced in these known processes and only a portion of the fatty acid content, namely the liquid low molecular weight portion could be easily obtained therefrom by distillation.

The oxidation of the hydrocarbon is carried out according to the present invention with the immediately following, practically simultaneous distillation of the fatty acids, formed by the oxidation, in such a way that not only the liquid fatty acids with low molecular weight but also the others of high molecular weight and being usually solid at atmospheric temperature, which are formed, pass over. For this purpose the initial material, for example paraffin, is treated on the one hand with oxidizing agents and on the other hand with distilling agents capable of driving off the formed fatty acids of high molecular weight. Oxygen must be considered as a pre-eminently suitable oxidizing agent and steam as a distilling agent. The oxygen can be used admixed with other, inert gases such for example as nitrogen. Such other, inert gases, or vapours, are also suitable as distilling agents for driving off the fatty acids, and can be used instead of, or in addition to steam. It has for example been shown that the oxidation and distilling off of the formed fatty acids may also be carried out, in the absence of other distilling agents, as for example steam, by intermittent use of air. The oxidizing agent and distilling agent for the fatty acids can be led in admixed with one another as for example, in the form of a mixture of oxygen and steam, or of air and steam, or separately. It has for example been found preferable to pass in the oxidizing agent first, for example, the oxygen alone into the reaction mixture e. g. molten paraffin and only to begin passing in the agent for driving off the fatty acids several moments after the reaction has commenced. The temperatures of the reaction mixture and the gas vapour or mixture to be passed in must be so regulated as to effect the object aimed at, namely smooth expulsion of the fatty acids formed. It has for example been generally found preferable when using steam for driving off fatty acids, to use this in super-heated condition, no matter whether the steam is to be passed in mixed, for example, with oxygen or air or separately from the oxidizing agent. It has also been found preferable when working with gases or gas mixtures in absence of steam, as for example when using air alone, to pass this in a highly heated condition into the reaction mixture.

While in the processes of the prior art the reaction temperature for oxidizing paraffin was never raised above 160° C. so as to prevent troublesome side reactions and more especially charring, considerably higher temperatures may be used in the present process, for example 160°–250° C. or more, and thus increased yields of fatty acids are obtained. The reaction mixture is preferably kept in constant motion during the process, for example by stirring.

The process may be carried out both in the absence, and presence of catalysts.

*Example.*

Steam and oxygen are passed into paraffin heated to 180° to 200° C. with strong stirring in such a way, for example, that after the oxygen has been passed in and the reaction has started superheated steam, either separately or admixed with the oxygen, is led in in addition to the oxygen. As the reaction proceeds exothermically, external heating may be stopped after the reaction has set in, and the temperature is regulated by the heated vapour and gas passed in. It has generally been found preferable to control the temperature of the reaction mixture during the process of oxidation at about 250° C. or over.

The fatty acids begin to distil over as a rule several minutes after the reaction has set in. The distillate obtained consists of a watery layer containing the fatty acids of low molecular weight, on which the fatty acids of high molecular weight collect in solid form, displaying a clear white colour.

The fatty acids of high molecular weight can be easily separated from the aforesaid watery layer, and the fatty acids of low molecular weight can also be obtained from the latter in any of the well known ways, for instance by removing the water therefrom.

The present process has in addition to the advantages already indicated the still further advantage that the danger of explosion which is always present in the known processes is avoided by using steam and similar vapours or gases.

We declare that what we claim is:

1. The process of making fatty acids from hydrocarbons, said process consisting in acting on the hydrocarbons in the liquid phase with an oxidizing agent and distilling off the fatty acids immediately upon their production.

2. The process of making fatty acids from hydrocarbons, said process consisting in acting on the hydrocarbons in the liquid phase with an oxidizing agent at a temperature of above 160° C. and distilling off the fatty acids immediately upon their production.

3. The process of making fatty acids from hydrocarbons, said process consisting in acting on the hydrocarbons in the liquid phase with an oxidizing agent at a temperature of above 160° C. and introducing a distilling agent causing the fatty acids to distill off immediately upon their production.

4. The process of making fatty acids from hydrocarbons, said process consisting in acting on the hydrocarbons in the liquid phase with an oxidizing agent in the presence of steam.

5. The process of making fatty acids from hydrocarbons, said process consisting in acting on the hydrocarbons in the liquid phase in the presence of superheated steam.

6. The process of making fatty acids from hydrocarbons, said process consisting in acting at a temperature of above 160° C. on the hydrocarbons in the liquid phase with an oxidizing agent in the presence of superheated steam.

7. The process of making fatty acids from hydrocarbons, said process consisting in acting on the hydrocarbons in the liquid phase with a gaseous ozidizing agent and distilling off the fatty acids immediately upon their production.

8. The process of making fatty acids from hydrocarbons, said process consisting in acting on the hydrocarbons in the liquid phase with a gaseous oxidizing agent in the presence of steam.

9. The process of making fatty acids from hydrocarbons, said process consisting in acting at a temperature of above 160° C. on the hydrocarbons in the liquid phase with a gaseous oxidizing agent in the presence of steam.

10. The process of making fatty acids from hydrocarbons, said process consisting in acting on the hydrocarbons in the liquid phase with a gaseous oxidizing agent in the presence of superheated steam.

11. The process of making fatty acids from hydrocarbons, said process consisting in acting on the hydrocarbons in the liquid phase with oxygen and distilling the fatty acids immediately upon their production.

12. The process of making fatty acids from hydrocarbons, said process consisting in acting on the liquid hydrocarbons in the liquid phase with oxygen in the presence of steam.

13. The process of making fatty acids from hydrocarbons, said process consisting in acting on the hydrocarbons in the liquid phase at a temperature of above 160° C. with oxygen in the presence of steam.

14. The process of making fatty acids from hydrocarbons, said process consisting in acting on the liquid hydrocarbons in the liquid phase with oxygen in the presence of superheated steam.

15. In the manufacture of fatty acids from hydrocarbons, by oxidizing the same with a gas mixture containing oxygen, the process comprising oxidizing the hydrocarbons in the presence of steam.

16. In the manufacture of fatty acids from hydrocarbons by oxidizing the same with a gas mixture containing oxygen, the process comprising oxidizing the hydrocarbons in the presence of superheated steam.

17. In the manufacture of fatty acids from hydrocarbons, by oxidizing the same with a gas mixture containing oxygen, the process comprising oxidizing the hydrocarbons at a temperature of above 160° C. in the presence of steam.

18. The process of making fatty acids from hydrocarbons, said process consisting in acting on the hydrocarbons in the liquid phase with oxygen in the presence of a catalyst and distilling off the fatty acids immediately upon their production.

19. The process of making fatty acids from hydrocarbons, said process consisting in acting on the hydrocarbons in the liquid phase with oxygen in the presence of a catalyst and of steam.

20. The process of making fatty acids from hydrocarbons, said process consisting in acting on the hydrocarbons in the liquid phase with oxygen in the presence of a catalyst and of superheated steam.

21. In the manufacture of fatty acids from hydrocarbons by oxidizing the same with a gas mixture containing oxygen, the process comprising oxidizing the hydrocarbons in the presence of a catalyst and of superheated steam.

22. The process of making fatty acids from hydrocarbons, said process consisting in acting on the hydrocarbons in the liquid phase with oxygen and after the said oxidizing action has started continuously distilling off the fatty acids immediately upon their production.

23. The process of making fatty acids from hydrocarbons, said process consisting in acting on the hydrocarbons in the liquid phase with oxygen and after the said oxidizing action has started, introducing steam into the reaction mixture thereby distilling off the fatty acids immediately upon their production.

24. The process of making fatty acids from paraffin, consisting in acting on paraffin in the liquid phase with an oxidizing agent and distilling off the fatty acids immediately upon their production.

25. The process of making fatty acids from paraffin, consisting in acting on the paraffin in the liquid phase with oxygen and distilling off the fatty acids immediately upon their production.

26. The process of making fatty acids from paraffin, consisting in acting on paraffin in the liquid phase with oxygen and distilling off the fatty acids immediately upon their production by steam.

27. The process of making fatty acids from paraffin, consisting in acting on the paraffin in the liquid phase with oxygen in the presence of superheated steam.

28. The process of making fatty acids from paraffin, consisting in acting on paraffin in the liquid phase at a temperature of above 160° C. with oxygen in the presence of steam.

29. In the manufacture of fatty acids from paraffin, said process comprising acting on the paraffin in the liquid phase with oxygen in the presence of steam.

30. In the manufacture of fatty acids from paraffin, the process comprising acting on the paraffin in the liquid phase with oxygen in the presence of superheated steam.

31. In the manufacture of fatty acids from paraffin, the process comprising acting on the paraffin in the liquid phase with oxygen at a temperature of above 160° C. in the presence of steam.

In testimony whereof we have affixed our signatures.

WALTHER CORNELIUS HARRY PATAKY.
FREDERIK JAN NELLENSTEIJN.